United States Patent [19]

Yamamoto

[11] 4,385,736
[45] May 31, 1983

[54] RETRACTOR FOR SEAT BELT

[75] Inventor: Yoshimi Yamamoto, Shizuoka, Japan

[73] Assignee: Fuji Kiko Kabushiki Kaisha, Tokyo, Japan

[21] Appl. No.: 240,974

[22] Filed: Mar. 5, 1981

[30] Foreign Application Priority Data

Mar. 26, 1980 [JP] Japan ............................. 55-40130[U]

[51] Int. Cl.³ ....................... A62B 35/00; B65H 75/48
[52] U.S. Cl. ......................................... 242/107; 242/74
[58] Field of Search ..... 242/74, 107, 107.4 R–107.4 E

[56] References Cited

U.S. PATENT DOCUMENTS

| | | | |
|---|---|---|---|
| 3,323,743 | 6/1967 | Landgraf | 242/74 |
| 3,348,789 | 10/1967 | Hirsch | 242/107.4 D |
| 3,522,676 | 1/1971 | Weber | 242/107.4 A |
| 3,952,967 | 4/1976 | Barile et al. | 242/107.4 R |
| 4,008,863 | 2/1977 | Fohl | 242/74 X |
| 4,090,678 | 5/1978 | Yamanashi | 242/107.4 A |
| 4,254,921 | 3/1981 | Adomeit | 242/107.4 C |

FOREIGN PATENT DOCUMENTS 55-116652 8/1980 Japan .

*Primary Examiner*—John M. Jillions
*Attorney, Agent, or Firm*—Lane, Aitken & Kananen

[57] ABSTRACT

A retractor for a seat belt includes a shaft to which a folded, sewed loop portion of the belt end is fastened, and a spool arranged concentrically outside the shaft on which the belt is wound. The spool contains a shaft member having an axially extending slot through which the belt is passed, and an engagement member arranged outside the shaft member to prevent loose winding of the end portion of the belt and consequent slackness in the event of the belt being pulled tight in a collision.

6 Claims, 8 Drawing Figures

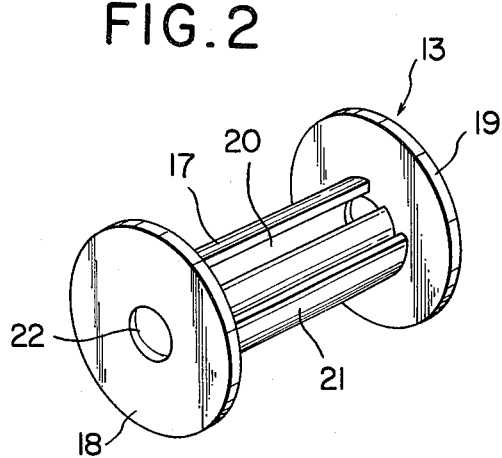
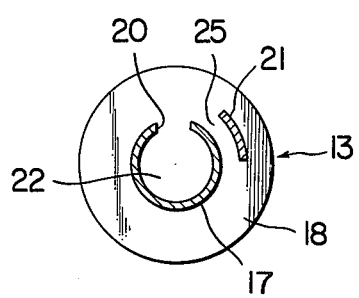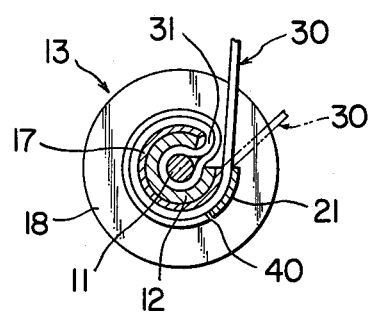

RETRACTOR FOR SEAT BELT

BACKGROUND OF THE INVENTION

1. Field of the Invention

This invention relates to a retractor for a seat belt fitted to a vehicle which adequately prevents slack in the belt from impairing its operation when a locking device comes into operation in an emergency.

2. Description of the Prior Art

A typical conventional retractor with a locking device for a seat belt fitted to a vehicle has a pin, a cylindrical shaft, and a spool, which are arranged concentrically in that order. The end of the belt is folded over and sewed to form a loop through which the pin is passed. The cylindrical shaft and the spool have axially extending slots formed therein and in register with each other and through which the belt is passed.

When the double thickness portion adjacent to the loop in the end of the belt is wound round the spool, it has a tendency due to its extra stiffness, not to wind neatly round the spool, but to be left rather slack, so that when the locking device comes into operation in a collision the belt does not lock immediately.

SUMMARY OF THE INVENTION

It is an object of the present invention to provide a retractor for a seat belt fitted to a vehicle which prevents slackness in the belt when a locking device comes into operation in an emergency.

It is another object of the present invention to provide a retractor for a seat belt fitted to a vehicle in which the belt is wound tightly.

These and other objects are attained according to the present invention by providing a retractor for a seat belt which includes a shaft to which a folded and sewed loop portion of the belt end is attached and a spool arranged concentrically outside the shaft on which the belt is wound; the spool contains a shaft member having an axially extending slot through which the belt is passed, and an engagement member arranged outside the shaft member to prevent the paying out of the folded portion and the loose winding of the belt.

The above and other objects, features and advantages of the present invention will be apparent from the following description of preferred and alternative embodiments thereof, taken in conjunction with the drawings.

BRIEF DESCRIPTION OF THE DRAWINGS

FIG. 2 is an enlarged view of the spool in FIG. 1;

FIG. 3 is a transverse section of the spool in FIG. 1;

FIGS. 4 and 5 are transverse sections of the spool winding the belt in FIG. 1;

DESCRIPTION OF THE PREFERRED EMBODIMENTS

Figure 1:
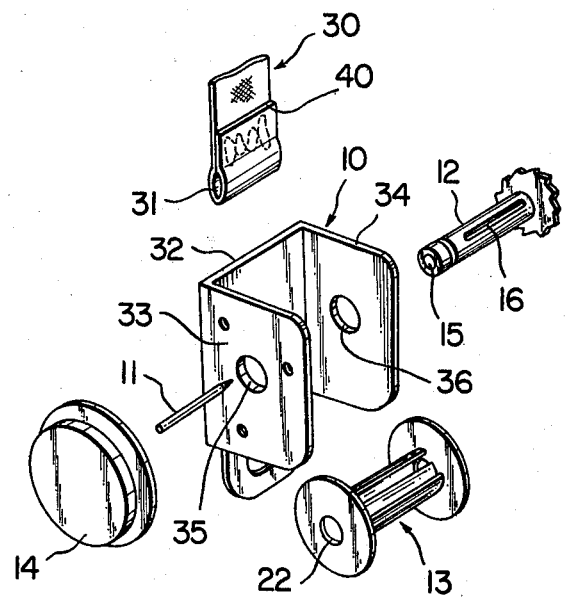
FIG. 1 is a exploded view of a retractor embodying the present invention.

FIG. 1 shows a disassembled retractor which includes a U-shaped channel housing 10, a center pin 11, a cylindrical shaft 12, a spool 13, and a spring casing 14. The shaft 12 has therein an axial through hole 15 of greater diameter than the center pin 11 to accommodate same, and an axially extending slot 16.

As shown in FIGS. 2 and 3, the spool 13 has a cylindrical shaft member 17 with an axially extending slot 20, two flanges 18 and 19 on opposite ends of the shaft member 17, and an engagement member 21, which may be all formed integrally of synthetic resin, or metal and so on to obtain a strong construction. The spool 13 is provided with an axial through hole 22 of slightly greater diameter than the cylindrical shaft 12 to accommodate same closely. The engagement member 21 extends axially from the flange 18 to the other flange 19 and also extends circumferentially, partially, and is spaced away from and outside the shaft member 17 to form therewith an axially and circumferentially extending space 25.

Returning to FIG. 1, the end of a seat belt 30 is folded over and fixed for example by sewing to form a loop 31, which has a greater inner diameter than the center pin 11 to accommodate same.

The housing 10 is composed of a back wall 32 and opposite side walls 33 and 34 having respective aligned holes 35 and 36 of such diameter that the cylindrical shaft 12 can be passed therethrough.

In assembly, the spool 13 is put into the housing 10 in such a manner as to align the holes 35 and 36 and the axial through hole 22, and then the cylindrical shaft 12 is inserted into the holes 35 and 36 and the hole 22. The slot 16 of the cylindrical shaft 12 and the slot 20 of the spool 13 have such lengths and widths that the folded loop portion 31 of the belt 30 can be passed therethrough.

Figure 5:
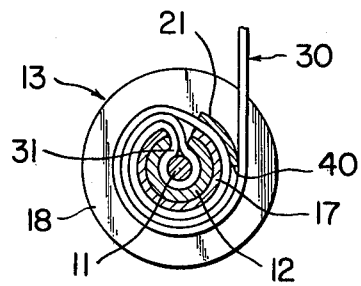

After these slots 16 and 20 are aligned with each other, the folded loop portion 31 of the belt 30 is passed through these slots 16 and 20 and is put into the through hole 15 of the shaft 12. Then the center pin 11 is inserted into the through hole 15 from the outside of the housing 10 so as to pass through the loop of the belt 30, and the spring casing 14 is fixed to the housing 10. Next, the other end of the belt 30 is passed through the space 25 on the spool 13 before the belt 30 is wound closely on the spool 13, as shown in FIGS. 4 and 5. In this case, the space 25 on the spool 13 is determined to be slightly wider than a single thickness of the belt 30 but narrower than the double thickness of the belt 30, while the folded portion 31 of the belt 30 is designed to have such length that the end 40 thereof will be positioned adjacent to the edge of the engagement member 21 when the belt 30 is tightly wound. Thus, the engagement member 21 prevents the folded portion 31 from being unwound when the belt 30 is fed out as shown by the broken lines in FIG. 4, so that the folded portion 31 remains wound closely. When wound up again by a return spring (not shown) within the casing 14 to urge the cylindrical shaft 12 circumferentially, the belt 30 is closely wrapped over itself and the engagement member 21.

Thus, the belt 30 is substantially avoided paying out when a locking device comes into operation in an emergency, because of the close winding thereof and especially of the folded portion 31.

Figure 6:
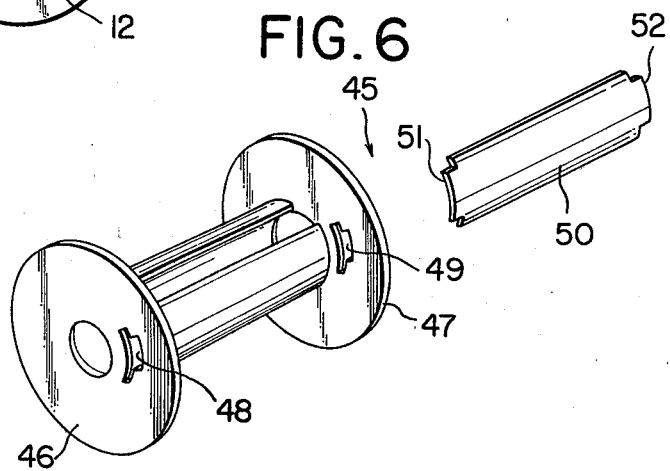
FIG. 6 is a exploded view of an alternative embodiment of the spool of the present invention.

FIG. 6 shows a disassembled alternative spool 45 which is similar to the spool 13 shown in FIG. 2 except for the following points. Flanges 46 and 47 of the spool 45 have respective circumferentially extending curved slots 48 and 49, which are aligned with each other. These slots 48 and 49 have a symmetrical stepped form so that the outside length thereof is less than the inside length.

An engagement member 50 has symmetrical stepped lugs 51 and 52 formed at both ends. The inside circumferential length of the slots 48 and 49 allow the whole engagement member 50 to be threaded therethrough, and when aligned axially, the engagement member 50 is moved somewhat outward radially, and the lugs 51 and 52 are of suitable width and length so as to engage neatly in the outside portions of the slots 48 and 49. Thus the engagement member 50 is prevented from moving axially and falling out of the spool 45. In this case the spool 45 may be formed and assembled very easily.

Figure 8:
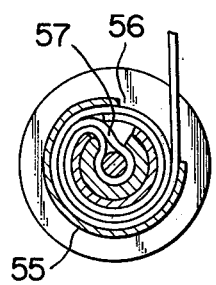
FIG. 8 is a transverse section view of a retractor incorporating the spool partly shown in FIG. 7.
Figure 7:
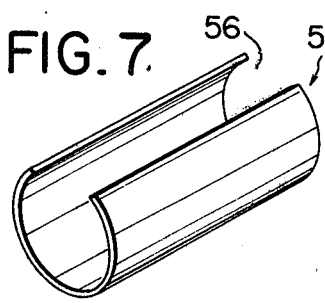
FIG. 7 is a perspective view of an essential portion of another spool embodying the present invention.

FIG. 7 shows an essential portion of another alternative spool 55, which is similar to the spool 13 illustrated in FIG. 2 except for the following points. An engagement member 55 takes a cylindrical shape with an axially extending gap 56 and is made of resilient material. As shown in FIG. 8, the engagement member 55 is clipped over the wound up double thickness portion 57 of the belt to retain it in the tightly wound state.

Although the present invention has been described in terms of a number of embodiments thereof, various modifications thereto remaining within the scope of the claims will be clear to those skilled in the art.

What is claimed is:

1. A retractor for a seat belt having a folded end and a non-folded portion, the retractor comprising:
   (a) a shaft to which the belt folded end is anchored;
   (b) a spool arranged concentrically outside the shaft, the spool having an axial slot through which the belt folded and extends to meet the shaft, part of the belt folded end to the outside of the spool being wound on the spool;
   (c) an engagement member arranged outside and spaced from the spool, the belt non-folded portion extending through the space between the engagement member and the spool, the space having a thickness slightly greater than that of the belt non-folded portion but less than that of the belt folded end, the boundary between the belt folded end and the belt non-folded portion being adjacent to an edge of the engagement member; and
   (d) means for fixing the engagement member to the spool;
   (e) whereby the belt folded end is prevented from being unwound when the belt non-folded portion is fed out.

2. A retractor as set forth in claim 1, wherein the engagement member extends axially and also circumferentially with respect to the shaft.

3. A retractor as set forth in claim 1, wherein the engagement member, the spool, and the fixing means are all formed integrally.

4. A retractor as set forth in claim 2, wherein the engagement member, the spool, and the fixing means are all formed integrally.

5. A retractor as set forth in claim 1, wherein:
   the spool has opposite radial flanges at its ends;
   the fixing means includes circumferentially extending slots through the radial flanges, the circumferential slots aligning axially and having a stepped form so that the circumferential length of the outer portion thereof is less than the circumferential length of the inner portion thereof, the circumferential length of the inner portion being chosen to allow the whole engagement member to be threaded therethrough;
   the engagement member extends axially and circumferentially;
   the fixing means includes stepped lugs formed on the circumferentially extending ends of the engagement member, the lugs being of such dimensions as to fit respectively in the outer portions of the circumferential slots; and
   the engagement member is fixed to the spool by threading the engagement member through the inner portions of the circumferential slots and subsequently moving the engagement member outwardly into the outer portions of the circumferential slots.

6. In combination, a retractor and a seat belt having a folded end and a non-folded portion, comprising:
   (a) a shaft to which the belt folded end is anchored;
   (b) a spool arranged concentrically outside the shaft, the spool having an axial slot through which the belt folded end extends to meet the shaft, part of the belt folded end to the outside of the spool being wound on the spool;
   (c) an engagement member arranged outside and spaced from the spool, the belt non-folded portion extending through the space between the engagement member and the spool, the space having a thickness slightly greater than that of the belt non-folded portion but less than that of the belt folded end, the boundary between the belt folded end and the belt non-folded portion being adjacent to an edge of the engagement member; and
   (d) means for fixing the engagement member to the spool;
   (e) whereby the belt folded end is prevented from being unwound when the belt non-folded portion is fed out.

* * * * *

UNITED STATES PATENT AND TRADEMARK OFFICE
CERTIFICATE OF CORRECTION

PATENT NO. : 4,385,736
DATED : May 31, 1983
INVENTOR(S) : YOSHIMI YAMAMOTO

It is certified that error appears in the above—identified patent and that said Letters Patent is hereby corrected as shown below:

Column 3, line 33, (claim 1, line 6), "and" should read -- end --.

Signed and Sealed this

Ninth Day of August 1983

[SEAL]

Attest:

Attesting Officer

GERALD J. MOSSINGHOFF

Commissioner of Patents and Trademarks